Patented Oct. 6, 1936

2,056,793

UNITED STATES PATENT OFFICE 2,056,793

PROCESS OF PREPARING RESIN COMPOSITIONS

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 26, 1934, Serial No. 722,482

3 Claims. (Cl. 106—22)

This invention relates to a new and improved method of preparing resin compositions and, more particularly, to the preparation of compositions comprising thermoplastic resins of the class consisting of the polymerization products of acrylic and alkacrylic acids, their homologues and derivatives, said compositions being valuable for the production of molding powders and other uses.

Molding compositions in granular form must fulfill certain conditions to be commercially acceptable. The ingredients of the compositions must be thoroughly blended together homogeneously to such a degree that an article subsequently molded from the mixture shall be of uniform composition and texture throughout, and of uniform color, that is, free from aggregates of undispersed coloring matter and from spots deficient in color. These compositions must be in granular to pulverulent condition to facilitate the handling. Customarily in molding shop practice the charges for the individual molds are made up by passing the granular compositions through a preforming or pelleting machine which automatically measures out a predetermined weight of the material and compresses the loose granular material into a hard and durable preform, this preform being much more readily loaded into the die than would be the material in its granular form.

Not only must the molding composition be in granular form but, in order to satisfactorily handle it in the preforming machines, it must not be too voluminous, that is to say, the granular material must have a sufficiently high bulk density, by which term is meant the apparent density of a granular molding compound in an untamped, loose condition, generally expressed in weight per unit volume as in the mixed term grams per cubic inch. The granular material must be in such condition as to feed readily by gravity from the hopper to the cavity of the pelleting machine and must not contain an undue proportion of fines which tend to cause the jamming of the plunger in the cavity of the pelleting machine by building up in the narrow clearance provided between them. Moreover, the granular material must not contain any individual particles of comparatively large size, as then the operation of the pelleting machine will be defective in that the automatic device which levels off the individual charge of material in the cavity will not accurately level material containing very coarse particles.

Heretofore methods have been proposed for the preparation of molding compositions having a base of resins of the type herein under consideration, which compositions are usable as molding compounds and which also may be worked up into useful products by other means. In general, the methods heretofore known for the preparation of homogeneous compositions of this type are uneconomical for commercial operation and/or involve subjecting the plastic masses to excessive temperatures or other conditions whereby the properties of the finished composition are deleteriously affected.

An object of the present invention is to provide a simple and economical process for producing homogeneous compositions of thermoplastic resins of the class consisting of the polymerization products of acrylic acids and alkacrylic acids, their homologues and derivatives, in conjunction with auxiliary ingredients, which compositions are suitable for various purposes and in particular for use as molding powders. A further object is to provide a process whereby such compositions may be produced in homogeneous granular form having the characteristics of bulk density and screen analysis which would make them suitable for economical handling in the molding industry. A still further object is to provide a process wherein the obvious drawbacks of the heretofore known processes are avoided.

The above objects are accomplished according to the present invention by kneading a thermoplastic resin from the class consisting of the polymerization products of acrylic and alkacrylic acids, their homologues and derivatives, usually in conjunction with auxiliary ingredients and substantially in the absence of volatile solvents, in comminuted form in a masticator mixer under positive pressure until a homogeneous, fully colloided, continuous plastic mass is obtained. Ordinarily the plastic mass thus obtained is allowed to cool to room temperature and then broken down into granular form to make it suitable for use as a molding powder, although it may be used in the plastic arts in other form, as will be understood by those skilled in the art.

The invention is broadly applicable to thermoplastic resins of the class consisting of the polymerization products of acrylic and alkacrylic acids and their derivatives and homologues, such as the nitriles, amides, substituted alkyl and substituted aryl derivatives of the acids and, particularly, the esters of the acids such as the alkyl esters of acrylic acid, methacrylic acid, ethacrylic acid, and the higher homologues. Specific resins included are the polymerization products of methyl and ethyl methacrylate and methyl and ethyl ethacrylate. These resins may be used singly or a mixture or two or more may be employed. Of this class of resins it is preferred to employ polymerized methyl methacrylate, whose preparation is disclosed in Rowland Hill application Serial No. 641,113, filed November 3, 1932. These thermoplastic resins need not be one hundred percent polymers of the monomer from which they are made and ordinarily contain some monomer. The presence of an appreciable proportion of monomer, for example, 10–45 parts, will increase the thermoplasticity of the resin and, for certain purposes, may be found advantageous.

It has been discovered that the severe kneading action obtainable in a masticator mixer is peculiarly and unexpectedly well adapted for forming comminuted resins of the type described above into compacted, fully colloided, continuous plastic masses and at the same time homogeneously incorporating therein plasticizers, coloring matter, fillers, and the like, in a remarkably short period of time without employing volatile solvents or excessive heat. In fact, even plasticizers may be omitted, if desired, and the use of exceptionally large amounts of plasticizers to offset the absence of volatile solvents or temperatures so high that the plastic mass may be injuriously affected, is absolutely unnecessary in the process of the present invention, thereby sharply distinguishing this process from those heretofore known using other types of mixers.

Masticator mixers are well known in the art, the so-called "Banbury" mixer being a prominent example. The masticator mixer comprises a working space within which rotate the mixing blades, ordinarily two in number, which are designed to have very small clearance with the wall of the working space. The mixer comprises further a ram, actuated by compressed air, or the like, which bears down upon the charge of material being mixed and forces the material to pass through the narrow clearances above mentioned with the result that the material is subjected to a very severe masticating action quite peculiar to this type of apparatus. The pressure ram could be replaced by any equivalent means for insuring that the plastic mass being kneaded is forced down between the blades of the mixer and the wall of the working space, rather than merely riding around with the blades and avoiding the kneading action. The term "under positive pressure" is used herein in its customary sense in this art, namely, that a pressure ram or equivalent device, is forcing the mixture down into the narrow clearances between the blades of the mixer and the adjacent walls so that the material is subjected to a very severe kneading action. In the specific examples given hereinafter a pressure of 10–50 pounds per sq. in. of ram surface was exerted on the pressure ram but it is to be understood that there is nothing critical about the pressure exerted on the ram and, consequently, upon the material in the mixer, so long as the material is prevented from merely riding around with the blades of the mixer and avoiding kneading action. The pressure on the ram, or equivalent device, will undoubtedly vary widely depending upon the size and design of masticator mixer which is employed.

In carrying out the present invention, the resin in question in comminuted but not necessarily pulverulent form, together with any auxiliary ingredients in desired proportions, is introduced into a masticator mixer in sufficient quantity so that the working space of the mixer is filled to such a point that the pressure ram of the mixer will operate to exert positive pressure upon the contents during the kneading action and thus force the material into the narrow clearances as desired. The mixer is set into motion with the pressure ram in operating position to exert positive pressure upon the mass within the mixer. The severe masticating action effects a homogenization of the mixture and also produces considerable heat, as a result of internal friction within the material, so that the mass ultimately reaches what is known to the art as a colloided condition. This colloided mass is dense, tough, and horny and, in the absence of pigments, fillers, and the like, is substantially transparent in appearance. It is discharged from the masticator mixer in the form of granules and lumps of various sizes which, preferably after being cooled, may be reduced by grinding to a granular form suitable for molding powders.

As sharply contrasted with the long period of kneading required in ordinary mixers to obtain a homogeneous colloided product, is the remarkably short period required to knead in a masticator mixer these resins to obtain a completely homogeneous and colloided mass. The operation is to be measured in minutes and rarely does the kneading action have to be prolonged over 15 minutes, more usually a period of about 5 minutes being ample.

The following examples illustrate specific embodiments of the invention, parts being given by weight:—

Example 1.—A mixture of 100 parts of polymerized methyl methacrylate resin, 26 parts of diamyl phthalate as a plasticizer therefor, and 2 parts of stearic acid as a mold lubricant, was loaded into a Banbury mixer in such quantity that, when the blades were set in motion and the pressure ram brought into operating position, the ram would exert positive pressure upon the charge so as to force it into the clearances between the blades and the walls of the mixer. The blades were set into motion, the pressure ram brought into operating position and the mixing continued until the charge had reached the condition of a homogeneous, compacted, colloided mass. The processing required 5 minutes and the temperature of the mass as discharged from the mixer immediately upon completion of the kneading cycle was between 99° C. and 104° C.

The material as discharged from the mixer was in the form of a mixture of lumps and granules which were cooled and then passed through a three-roll grinding mill. There was thus produced a granular product having a bulk density of 8.1 grams per cubic inch and a screen analysis as follows:

*Screen analysis*

| | |
|---|---|
| On 10 mesh | 27.1 |
| 20 | 63.8 |
| 40 | 7.2 |
| 60 | 1.3 |
| 80 | 0.3 |
| 100 | 0.2 |
| Through 100 | 0.1 |

The granular material was molded in a suitable die by the application of a temperature of 150° C. and a pressure of 2500 pounds per square inch of projected area, followed by a cooling before the article was removed from the die. The article was homogeneous in appearance and uniformly strong and evenly textured.

*Example 2.*—A mixture of 100 parts of polymerized methyl methacrylate resin and 2 parts of stearic acid was loaded into a Banbury mixer and processed in the same manner as in Example 1. A homogeneous, compacted, completely colloided mass was obtained when the temperature of the charge had reached about 171° C. which occurred after 14 minutes' kneading. In this example no plasticizer was used, thus necessitating a somewhat longer kneading cycle than in Example 1, and an appreciably higher temperature.

The resulting mass was cooled and granulated by grinding. An article of homogeneous appearance and uniformly strong was obtained by molding this material by the application of a temperature of 170° C. and a pressure of 4500 pounds per square inch of projected area, followed by cooling and removal of the article from the die.

*Example 3.*—A mixture of 100 parts of polymerized methyl methacrylate resin, 11.3 parts of tributyl phosphate as a plasticizer therefor, and 0.6 part of stearic acid was loaded into a Banbury mixer and worked as in Examples 1 and 2. A molding powder was obtained which could be molded into articles of satisfactory appearance and strength.

*Example 4.*—A mixture of 100 parts of polymerized methyl methacrylate resin, 5.3 parts of diamyl phthalate, and 0.5 part of stearic acid was loaded into a Banbury mixer and treated as in the preceding examples, the resulting composition being satisfactory for use as a molding powder.

The above examples are merely illustrative of the invention which broadly includes kneading in a masticator mixer under positive pressure any one or more of the resins disclosed, with or without other ingredients, until a homogeneous, compacted, colloided mass is formed which may be broken down into granular form for use as a molding powder, or may be subjected to known plastic processes such as rolling, slabbing, cake pressing, extruding, dope making, and the like.

The resin preferably should be in fairly finely divided form, although not necessarily pulverulent, in order that homogenization of the composition may not be unduly delayed by the need of breaking down coarse particles. Obviously the resin may very well be used in the form of coarse particles if its physical condition is such that it would be practically immediately broken down into finely divided form upon setting the mixer in motion.

Auxiliary ingredients may be added to the resin such as would be used for the ordinary purpose of modifying the resin with respect to color, rigidity, mechanical strength, electrical properties, and the like, to meet the requirements of use of the ultimate product made therefrom. In ordinary commercial operation coloring ingredients and plasticizers would be used. The coloring ingredients may be pigments or dyestuffs and it has been found that no special provision is necessary for preliminary preparation of coloring ingredients. Usually the mixture to be introduced into the Banbury is formed by adding the ingredients to some ordinary light construction mixing device to give a preliminary mixing and it has been found that, if coloring matter is merely introduced in a dry condition into this preliminary mixer, the coloring matter will be uniformly distributed throughout the plastic composition at the end of the kneading cycle in the masticator mixer. Certain pigment colors are more refractory in this respect, tending to resist dispersion by the kneading action and to remain in agglomerated form, distributed throughout the mass, so as to produce a nonuniform or speckled appearance. When dealing with such pigments, or, for example, when dealing with a plastic mixture which is so readily kneaded to an otherwise homogeneous colloided condition as to allow insufficient time for the dispersion of the coloring matter, it is desirable to subject the coloring matter to a special preliminary treatment to promote its dispersion, such as grinding it either alone or with all or a portion of one of the other ingredients of the molding compound to be made. It is by no means necessary that the ingredients be given any preliminary mixing before introduction into the masticator mixer but such preliminary mixing is usually found convenient.

A large number of plasticizers are suitable for use in these compositions, among which are the following:— camphor; phthalates, such as ethyl, propyl, isopropyl, butyl, isobutyl, cyclohexyl, methyl cyclohexyl, methoxyethyl, ethoxyethyl, or benzyl phthalate or phthalates of the mixed type such as cyclohexyl butyl, benzyl butyl or butyl lauryl phthalate; esters of dibasic acids, such as the ethyl, propyl, isopropyl, butyl, isobutyl, cyclohexyl, methyl cyclohexyl or benzyl esters of succinic, fumaric, tartaric, adipic, methyladipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g., glycol and glycerol, such as glycol benzoate, glycol laevulinate, triacetin, tripropionin and tributyrin; substituted toluene sulphonamides, such as ethyl paratoluene-sulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and phosphates such as triphenyl and tricresyl phosphates.

Fillers such as china clay, terra alba, gypsum, asbestos, wood flour, cotton flock, and the like; effect materials such as bronze powders, pearl essence, and the like; lubricants such as stearic acid, metallic soaps, e. g., aluminum palmitate and calcium stearate; and waxes, e. g., carnauba and candelilla wax; and other miscellaneous ingredients such as natural resins, other synthetic resins, and the like, may be included in the composition to be processed according to the present invention. The inclusion of such ingredients and the proportions thereof will be determined by the particular properties desired in the finished composition and not with relation to the working of the process of the present invention.

The homogenization of the mixture introduced into the masticator mixer is directly a result of the severe masticating action to which it is subjected and the degree of homogenization is primarily a function of the time of mixing, although it is true that homogenization is facilitated by the softening of the resin which results from the heat developed during the kneading cycle. On the other hand, the colloiding of the mass is dependent primarily upon the temperature to which it is carried and very little upon the time of mixing. In order that any given mixture shall reach a colloided state it is, in general, requisite that it shall be subjected to a certain minimum temperature. The ease with which a given mixture is rendered homogeneous will be dependent, inter alia, upon the character and initial fineness of the ingredients. The ease with which a given mixture will reach a colloided state, under given conditions of rise of temperature, (or conversely, the temperature required to effect the formation of a colloided mass), will depend, inter alia, upon the softening temperature of the resin, upon the strength of solvent action developed by any plasticizer which may be used, (e. g., upon the character and proportion of the plasticizer), upon the proportion of inert ingredients present, (e. g., fillers, pigments, et cetera), and upon the characteristic influence of any other ingredient which may be involved.

Accordingly the process may be controlled, by suitable heating or cooling of the mixing apparatus, and by control of the size of the charge put into it so that homogenization and the development of the colloided mass will be effected in a minimum time and at a minimum temperature. If, for example, under certain conditions the mass tends to heat up to a temperature beyond that required for the formation of a colloid but in a period of time insufficient to effect homogenization, the obvious remedy, in order to avoid damage to the mass which might result from excessive temperature, is to start the operation with the mixer at a lower temperature, or to apply cooling means during the processing, so that an excessively high temperature is not reached before homogenization is effected. In general, the heat required for effecting colloiding is derived for the most part from the internal friction of the plastic mass and the application of heat from external sources is frequently unnecessary.

On the other hand, if, for example, under certain conditions the mass tends to become fully homogeneous before colloidalization, then the mixer may be heated initially or during the processing in order that the minimum temperature for colloiding the particular mixture may be quickly reached and the colloiding speeded up so that it will be effected at approximately the same time the material becomes substantially homogeneous.

The homogeneous, fully colloided material as removed from the masticator mixer is, of course, at an elevated temperature, usually at least 100° C. In order to reduce this material to granular form for use as a molding powder it is preferred to first cool the material down, as this facilitates the grinding. The material may be reduced to granular form by any known grinding means such as a hammer mill, a rotary mill, a three-roll mill, or the like.

An advantage of the present invention is that it provides a process in which the use of volatile solvents is entirely unnecessary and, accordingly, the process is free from the expense arising from loss of solvent and cost of recovering solvent. In the present process the use of volatile solvents may be dispensed with even when the plasticizer is present in only small proportions or absent altogether, as illustrated in Example 2. A further advantage of the present process is that it may be carried out at a moderate temperature, particularly where plasticizers are employed in the usual amounts, thus avoiding a serious objection to heretofore proposed processes wherein the temperature reached was so great as to have an undesirable effect upon the coloring ingredients, the plasticizers, or the resins themselves. A further advantage of the process is that it is carried out in a fraction of the time which would be required for the preparation of homogeneous, colloided masses by ordinary mixing means and thus further minimizes exposure of the material to heat and, of course, shortens the processing cycle which makes possible a large production per day per unit with correspondingly low labor cost. Upon breaking down the colloided plastic mass produced according to the present process, a granular material of high bulk density and satisfactory screen analysis is obtained, i. e., a highly satisfactory material for use in molding shop practice. Also the present process provides means of making a transparent plastic mass free from discoloration, dirt, or any contamination which would cause haze.

As many apparently widely different embodiments of this invention may be made without departing from the spirit and scope thereof, it is to be understood that the invention is not limited to the specific embodiments thereof except as defined in the appended claims.

We claim:

1. Process of preparing molding compositions comprising kneading, in the absence of volatile solvent, hard, dry, comminuted polymerized methyl methacrylate resin in a masticator mixer under positive pressure until a homogeneous, compacted, colloided mass is obtained, removing said mass from the mixer and breaking it down into granular form.

2. Process of preparing molding compositions comprising kneading, in the absence of volatile solvent, a mixture comprising hard, dry, comminuted polymerized methyl methacrylate resin and a plasticizer for said resin, in a masticator mixer under positive pressure until a homogeneous, compacted, colloided mass is obtained.

3. Process of preparing molding compositions comprising kneading, in the absence of volatile solvent, a mixture comprising hard, dry, comminuted polymerized methyl methacrylate resin, a plasticizer for said resin, a mold lubricant, and a pigment, in a masticator mixer under positive pressure until a homogeneous, compacted, colloided mass is obtained, removing said mass from the mixer and breaking said mass down into granular form.

MAURICE L. MACHT.
ALAN F. RANDOLPH.